(12) United States Patent
Hamilton, II et al.

(10) Patent No.: US 9,003,304 B2
(45) Date of Patent: Apr. 7, 2015

(54) METHOD AND APPARATUS FOR MOVING AN AVATAR IN A VIRTUAL UNIVERSE

(75) Inventors: Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2229 days.

(21) Appl. No.: 11/839,868

(22) Filed: Aug. 16, 2007

(65) Prior Publication Data
US 2009/0046109 A1     Feb. 19, 2009

(51) Int. Cl.
G06F 3/14       (2006.01)
G06T 19/00      (2011.01)
G06F 3/0481     (2013.01)
G06T 15/20      (2011.01)

(52) U.S. Cl.
CPC .......... *G06F 3/04815* (2013.01); *G06T 19/003* (2013.01); *G06T 15/20* (2013.01)

(58) Field of Classification Search
USPC ............... 345/8, 419, 629; 709/231; 719/772, 719/850; 726/26; 715/200–277; 700/701–799
See application file for complete search history.

(56) References Cited

U.S. PATENT DOCUMENTS

| | | | |
|---|---|---|---|
| 4,902,469 A | 2/1990 | Watson et al. | |
| 5,371,851 A | 12/1994 | Pieper et al. | |
| 5,537,618 A | 7/1996 | Boulton et al. | |
| 5,736,982 A | 4/1998 | Suzuki et al. | |
| 5,898,423 A | 4/1999 | Tognazzini et al. | |
| 5,966,129 A | 10/1999 | Matsukuma et al. | |
| 5,969,720 A | 10/1999 | Lisle et al. | |
| 5,982,372 A | 11/1999 | Brush, II et al. | |
| 5,983,003 A | 11/1999 | Lection et al. | |
| 6,023,270 A | 2/2000 | Brush, II et al. | |
| 6,023,698 A | 2/2000 | Lavey et al. | |
| 6,064,389 A | 5/2000 | Berry et al. | |
| 6,137,904 A | 10/2000 | Lubin et al. | |
| 6,219,045 B1 | 4/2001 | Leahy et al. | |
| 6,226,009 B1 | 5/2001 | Carraro et al. | |
| 6,298,374 B1 | 10/2001 | Sasaki et al. | |

(Continued)

OTHER PUBLICATIONS

Brown, Stuart; Google Browser—The Future of the Internet?; Nov. 5, 2004; FirstScience.com; http://www.firstscience.co.uk/SITE/editor/077_ramblings_05112004.asp.

(Continued)

*Primary Examiner* — Ruay Ho
(74) *Attorney, Agent, or Firm* — Robert C. Rolnik

(57) ABSTRACT

A computer implemented method, apparatus, and computer usable program code for moving an avatar. A computer renders a first viewport in a computer display. The first viewport may comprise a first tab, a first coordinate, and a first attitude. A first object is rendered based on the first coordinate and the first attitude in a region. The computer renders a second tab. The computer receives a user selection corresponding to the second tab. Next, the computer renders a second viewport comprising a second coordinate and a second attitude. The computer renders the second object in a computer display from a perspective distinct from the first viewport. In addition, the computer registers the avatar as associated with the second coordinate and second attitude in the virtual universe, wherein the first tab is a visual indication of movement history.

20 Claims, 8 Drawing Sheets

(56) References Cited

U.S. PATENT DOCUMENTS

| | | | |
|---|---|---|---|
| 6,329,986 B1 | 12/2001 | Cheng | |
| 6,346,938 B1* | 2/2002 | Chan et al. | 345/419 |
| 6,346,956 B2 | 2/2002 | Matsuda | |
| 6,388,688 B1 | 5/2002 | Schileru-Key | |
| 6,437,777 B1 | 8/2002 | Kamachi et al. | |
| 6,496,851 B1 | 12/2002 | Morris et al. | |
| 6,570,587 B1 | 5/2003 | Efrat et al. | |
| 6,580,441 B2 | 6/2003 | Schileru-Key | |
| 6,636,889 B1 | 10/2003 | Estrada et al. | |
| 6,674,484 B1 | 1/2004 | Boland et al. | |
| 6,732,146 B1 | 5/2004 | Miyake | |
| 6,753,857 B1 | 6/2004 | Matsuura et al. | |
| 6,763,371 B1 | 7/2004 | Jandel | |
| 6,767,827 B1 | 7/2004 | Okada et al. | |
| 6,772,195 B1 | 8/2004 | Hatlelid et al. | |
| 6,784,901 B1* | 8/2004 | Harvey et al. | 715/757 |
| 6,981,223 B2 | 12/2005 | Becker et al. | |
| 6,982,372 B2 | 1/2006 | England | |
| 6,990,381 B2 | 1/2006 | Nomura et al. | |
| 7,146,627 B1 | 12/2006 | Ismail et al. | |
| 7,155,680 B2 | 12/2006 | Akazawa et al. | |
| 7,181,690 B1 | 2/2007 | Leahy et al. | |
| 7,269,632 B2 | 9/2007 | Edeker et al. | |
| 7,293,235 B1 | 11/2007 | Powers et al. | |
| 7,515,156 B2 | 4/2009 | Tinker et al. | |
| 7,643,673 B2 | 1/2010 | Rohlf et al. | |
| 7,827,208 B2 | 11/2010 | Bosworth et al. | |
| 8,150,941 B2 | 4/2012 | Edecker et al. | |
| 8,345,049 B2 | 1/2013 | Hamilton, II et al. | |
| 8,671,349 B2 | 3/2014 | Hamilton, II et al. | |
| 2001/0055039 A1 | 12/2001 | Matsuda | |
| 2002/0026477 A1 | 2/2002 | Choi | |
| 2002/0041327 A1 | 4/2002 | Hildreth et al. | |
| 2002/0112002 A1 | 8/2002 | Abato | |
| 2002/0130904 A1 | 9/2002 | Becker et al. | |
| 2002/0138607 A1 | 9/2002 | O'Rourke et al. | |
| 2002/0152147 A1 | 10/2002 | Shulman et al. | |
| 2002/0158873 A1 | 10/2002 | Williamson | |
| 2003/0040946 A1 | 2/2003 | Sprenger et al. | |
| 2003/0067554 A1 | 4/2003 | Klarfeld et al. | |
| 2003/0122858 A1 | 7/2003 | Mauve | |
| 2003/0126318 A1 | 7/2003 | Nomura et al. | |
| 2003/0172174 A1* | 9/2003 | Mihalcheon | 709/231 |
| 2003/0187984 A1 | 10/2003 | Banavar et al. | |
| 2003/0212760 A1 | 11/2003 | Chen et al. | |
| 2004/0002380 A1 | 1/2004 | Brosnan et al. | |
| 2004/0034831 A1 | 2/2004 | Grober et al. | |
| 2004/0130549 A1 | 7/2004 | Tinker et al. | |
| 2004/0252123 A1 | 12/2004 | Estrada et al. | |
| 2004/0261037 A1 | 12/2004 | Ording et al. | |
| 2005/0022139 A1 | 1/2005 | Gettman et al. | |
| 2005/0210413 A1 | 9/2005 | Quek et al. | |
| 2005/0216346 A1 | 9/2005 | Kusumoto et al. | |
| 2005/0278323 A1 | 12/2005 | Horvitz et al. | |
| 2006/0010229 A1 | 1/2006 | Chen et al. | |
| 2006/0026233 A1 | 2/2006 | Tenembaum et al. | |
| 2006/0080613 A1 | 4/2006 | Savant | |
| 2006/0085759 A1 | 4/2006 | Knapheide | |
| 2006/0119598 A1 | 6/2006 | Littlefield | |
| 2006/0123351 A1 | 6/2006 | Littlefield | |
| 2006/0212900 A1 | 9/2006 | Ismail et al. | |
| 2006/0284792 A1* | 12/2006 | Foxlin | 345/8 |
| 2007/0035548 A1 | 2/2007 | Jung et al. | |
| 2007/0050716 A1 | 3/2007 | Leahy et al. | |
| 2007/0050721 A1 | 3/2007 | de Souza | |
| 2007/0218965 A1 | 9/2007 | Tilston et al. | |
| 2007/0240119 A1 | 10/2007 | Ducheneaut et al. | |
| 2008/0086696 A1 | 4/2008 | Sri Prakash et al. | |
| 2008/0134056 A1 | 6/2008 | Shuster | |
| 2008/0291217 A1* | 11/2008 | Vincent et al. | 345/629 |
| 2009/0013052 A1* | 1/2009 | Robarts et al. | 709/206 |
| 2009/0046094 A1 | 2/2009 | Hamilton, II et al. | |
| 2009/0064052 A1* | 3/2009 | Mihalcheon | 715/850 |
| 2009/0094535 A1 | 4/2009 | Bromenshenkel et al. | |
| 2009/0165140 A1* | 6/2009 | Robinson et al. | 726/26 |
| 2009/0222276 A1 | 9/2009 | Romney et al. | |
| 2009/0267938 A1 | 10/2009 | Nicol, II et al. | |
| 2009/0276718 A1 | 11/2009 | Dawson et al. | |
| 2009/0288002 A1 | 11/2009 | Hamilton, II et al. | |
| 2010/0011312 A1* | 1/2010 | Banerjee et al. | 715/772 |
| 2011/0279461 A1 | 11/2011 | Hamilton, II et al. | |
| 2013/0009972 A1 | 1/2013 | Hamilton, II et al. | |

OTHER PUBLICATIONS

Anonymous; Window (computing); Download date: Jun. 3, 2007; Wikipedia; http://en.wikipedia.org/wiki/Window_(computing).

Huang; Sharing Interactive 3D Scenes in a Distributed Collaborative Environment; Masters Thesis, Rensselaer Polytechnic Institute; Jul. 2003; 104 pages.

Newitz; Your Second Life if Ready; Popular Science; Oct. 2006; 4 pages.

Grammenos; Virtual Prints: leaving trails in virtual environments; Proceedings of the Workshop on Virtual Environments 2002; May 2002; pp. 131-138, 222.

Prendergast, Roberta D; Non-Final Office Action; Dated: Sep. 30, 2010; U.S. Appl. No. 11/839,884; USPTO.

Chauhan, Ulka J.; Non-Final Office Action; Dated: Oct. 1, 2010; U.S. Appl. No. 11/839,898; USPTO.

Judson; Virtual Venue Management Users Guide; Argonne National Laboratory, Mathematics and Computer Science Division Technical Memorandum No. 287; Feb. 2006.

Stardock.com; The User Guide-Version 2; DesktopX, 2000; 57 pages.

Wang; SmartCU3D: a collaborative virtual environment system with behavior based interaction management; Proceedings of the ACM Symposium on Virtual Reality Software and Tech.

Book; Moving Beyond the Game: Social Virtual Worlds; State of Play 2 conference, New York Law School, Oct. 2004; 13 pages.

Celentano; Adaptive interaction in Web3D virtual worlds; Proceedings of the Ninth International Conference on 3D Web Technology; Apr. 2004; pp. 41-50.

Chittaro; Dynamic generation of personalized VRML content; Proceedings of the Seventh International Conference on 3D Web Technology; Feb. 2002; pp. 145-154.

Elvins; Worldlets: 3D thumbnails for 3D browsing; Proceedings of the SIGCHI Conference on Human Factors in Computing Systems, Apr. 1998; pp. 163-170.

Elvins; Worldlets-3D Thumbnails for Wayfinding in virtual environments;Proceedings of the 10th Annual ACM Symposium on User Interface Software and; Oct. 1997; pp. 21-30.

Rolnik, Robert C.; Response to Office Action; Dated Dec. 23, 2010; U.S. Appl. No. 11/839,884; USPTO.

Rolnik, Robert C.; Response to Office Action; Dated Jan. 3, 2011; U.S. Appl. No. 11/839,898; USPTO.

McComas, Michael P.; Non-Final Office Action; Dated Mar. 17, 2011; U.S. Appl. No. 12/120,968; USPTO.

Prendergast, Roberta D; Final Office Action; Dated: Mar. 22, 2011; U.S. Appl. No. 11/839,898; USPTO.

Rolnik, Robert C.; Request for Continued Examination; Dated Jun. 2, 2011; U.S. Appl. No. 11/839,898; USPTO.

Prendergast, Roberta D; Notice of Allowance; Dated: Mar. 28, 2011; U.S. Appl. No. 11/839,884; USPTO.

Henn, David E.; Response to Non-Final Office Action; Dated Jun. 17, 2011; U.S. Appl. No. 12/120,968; USPTO.

Rolnik, Robert C.; Spawning Projected Avatars in a Virtual Universe; Jun. 6, 2011; U.S. Appl. No. 13/154,043; USPTO.

McComas, Michael P.; Final Office Action; Dated Aug. 24, 2011; U.S. Appl. No. 12/120,968; USPTO.

Henn, David E.; Amendment after Final Office Action; Dated Oct. 24, 2011; U.S. Appl. No. 12/120,968; USPTO.

Prendergast, Roberta; Office Action; Dated Nov. 4, 2011; U.S. Appl. No. 13/154,043; USPTO.

Henn, David E.; Request for Continued Examination; Dated Dec. 6, 2011; U.S. Appl. No. 12/120,968; USPTO.

Rolnik, Robert C.; Preliminary Amendment; Jun. 6, 2011; U.S. Appl. No. 13/154,043; USPTO.

(56) References Cited

OTHER PUBLICATIONS

Predergast, Roberta D.; Office Action; Dec. 23, 2011; U.S. Appl. No. 11/839,898; USPTO.
Hamilton, et al; Supplemental Amendment; Jan. 12, 2012; U.S. Appl. No. 12/120,968; USPTO.
Hamilton, et al; Response to Office Action; Jan. 23, 2012; U.S. Appl. No. 13/154,043; USPTO.
Elvins, T. T., et al; Wordlets: 3D thumbnails for 3D browsing; Proceedings of the SIGCHI Conference on Human Factors in Computing Systems; Apr. 18-23, 1998; ACM Press/Addison-Wesley Publishing Co., NY, NY; pp. 163-1.
Amund Tveit; Customizing Cyberspace: Methods for User Representation and Prediction; Thesis, Department of Computer Science, Norwegian University of Science and Technology; Trondheim, Norway; Jul. 1, 2004; 187 pages.
Hamilton II, Rick A; Response to Office Action; Mar. 6, 2012; U.S. Appl. No. 11/839,898; USPTO.
McComas, Michael P; Office Action; U.S. Appl. No. 12/120,968; dated Mar. 29, 2012; USPTO.
Prendergast, Roberta D.; Office Action; Dated Sep. 30, 2010; U.S. Appl. No. 11/839,884; USPTO.
Prendergast, Roberta D.; Notice of Allowance; Dated Mar. 28, 2011; U.S. Appl. No. 11/839,884; USPTO.
Prendergast, Roberta D.; Office Action; Dated Nov. 4, 2011; U.S. Appl. No. 13/154,043; USPTO.
Prendergast, Roberta D.; Notice of Allowance; Dated Aug. 8, 2012; U.S. Appl. No. 13/154,043; USPTO.
Du, Haixia; Office Action; Dated Apr. 16, 2013; U.S. Appl. No. 13/618,850; USPTO.
Du, Haixia; Final Office Action; Dated Sep. 13, 2013; U.S. Appl. No. 13/618,850; USPTO.
Du, Haixia; Notice of Allowance; Dated Dec. 5, 2013; U.S. Appl. No. 13/618,850; USPTO.
Prendergast, Roberta D.; Office Action; Dated Oct. 1, 2010; U.S. Appl. No. 11/839,898; USPTO.
Prendergast, Roberta D.; Final Office Action; Dated Mar. 22, 2011; U.S. Appl. No. 11/839,898; USPTO.
Prendergast, Roberta D.; Office Action; Dated Dec. 23, 2011; U.S. Appl. No. 11/839,898; USPTO.
Prendergast, Roberta D.; Notice of Allowance; Dated Aug. 17, 2012; U.S. Appl. No. 11/839,898; USPTO.
McComas, Michael; Office Action; Dated Mar. 17, 2011; U.S. Appl. No. 12/120,968; USPTO.
McComas, Michael; Final Office Action; Dated Aug. 24, 2011; U.S. Appl. No. 12/120,968; USPTO.
McComas, Michael; Office Action; Dated Mar. 29, 2012; U.S. Appl. No. 12/120,968; USPTO.
McComas, Michael; Notice of Allowance; Dated Aug. 20, 2012; U.S. Appl. No. 12/120,968; USPTO.
Mozilla; Tabbed Browsing; Nov. 3, 2004; pp. 1-3; http://www.mozilla.org/products/firefox/tabbed-browsing.html.
Fernando; Cloning and Teleporting Avatars Across Workstations and Mobile Devices in Collaborative Virtual Environments: Clipboard Operations for Virtual Reality; Proceedings of the International Conference on Information and Automation, Dec. 15-18, 2005.

\* cited by examiner

| | SEQUENCE NUMBER | COORDINATE | REGION | ATTITUDE OR ORIENTATION |
|---|---|---|---|---|
| 501 | | | | |
| 511 | 1 | (300, 400) | CHIENT | 180 DEGREES |
| 512 | 2 | (100, 200) | KUULA | 270 DEGREES |
| | 3 | (500, 600) | GAMA | 10 DEGREES |
| | ⋮ | ⋮ | ⋮ | ⋮ |

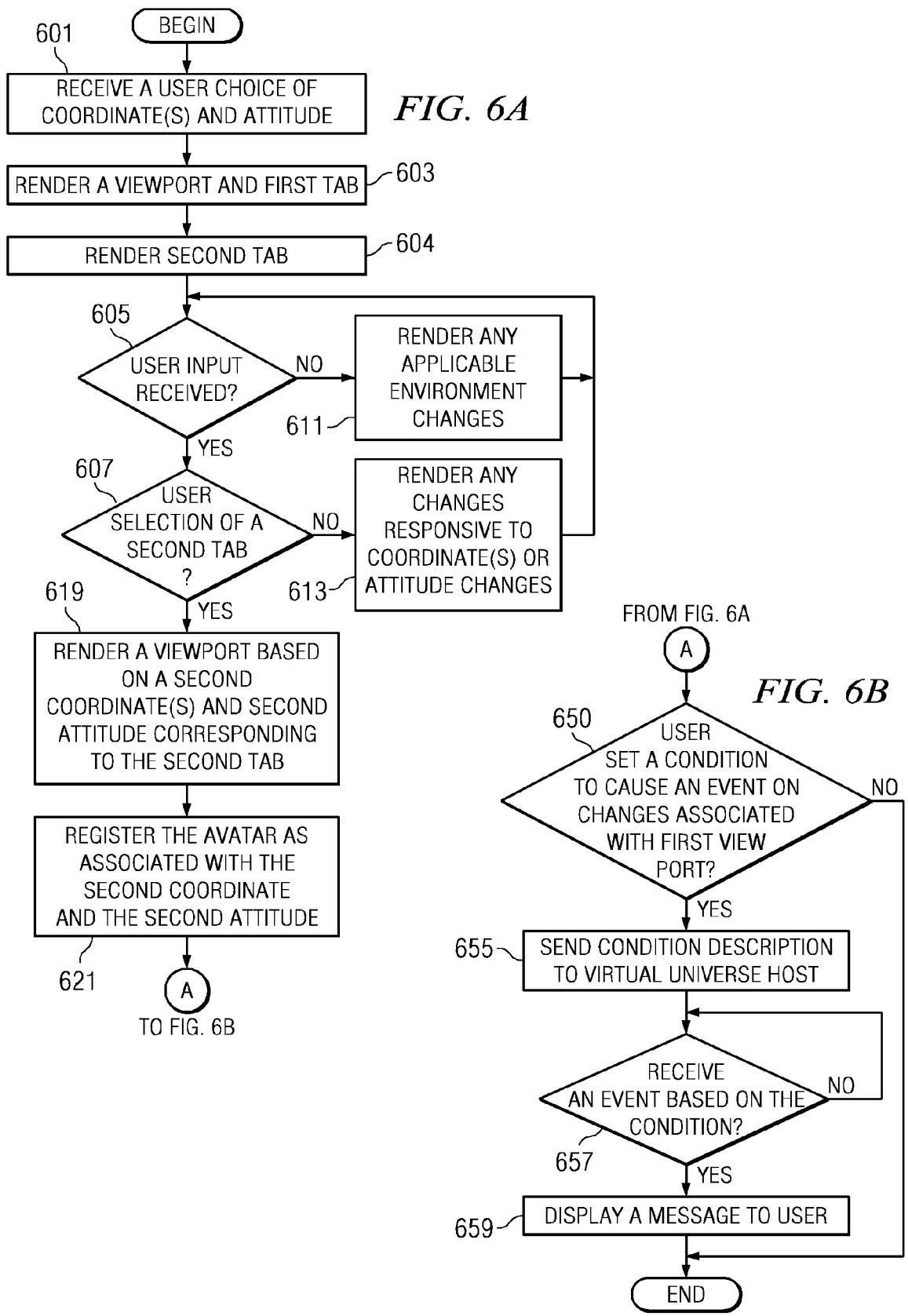

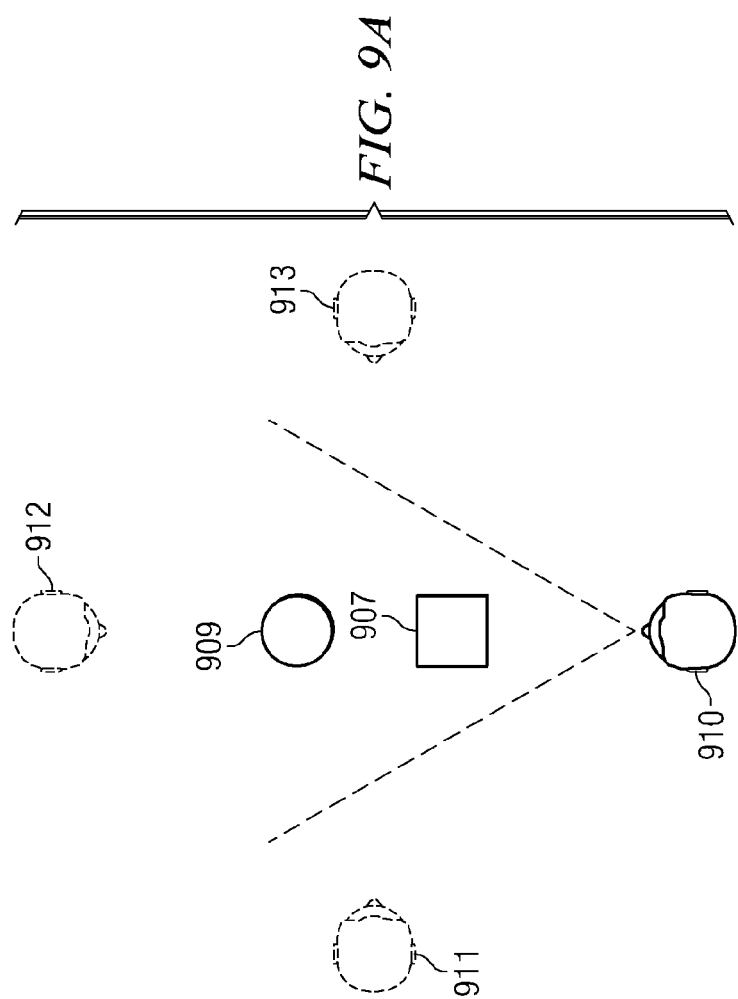

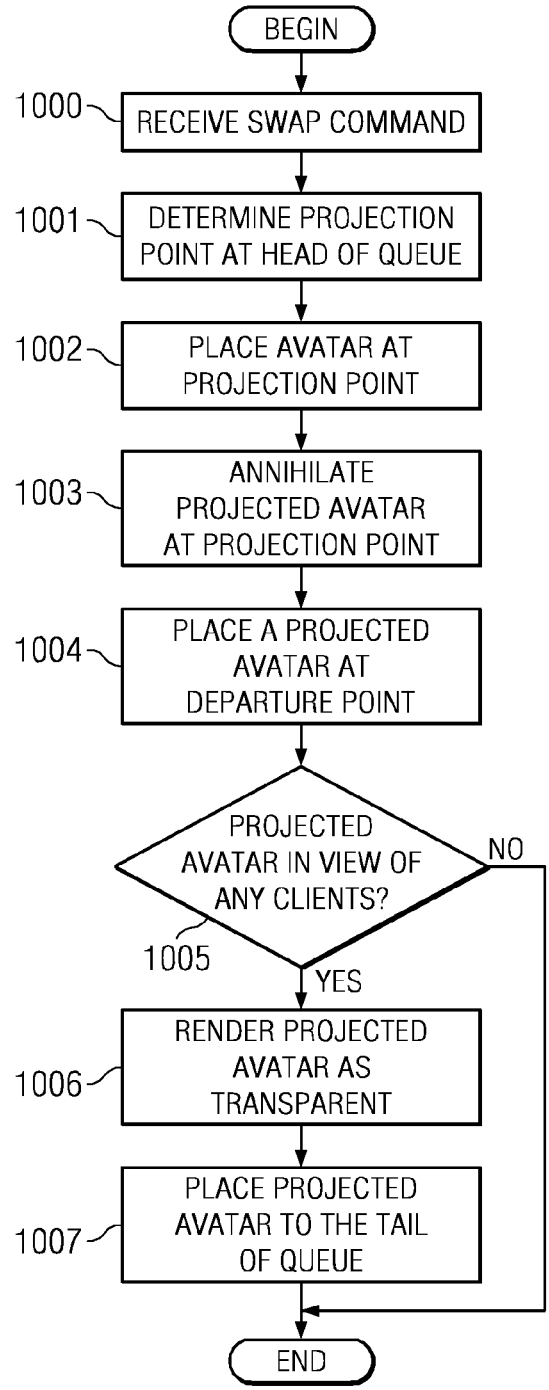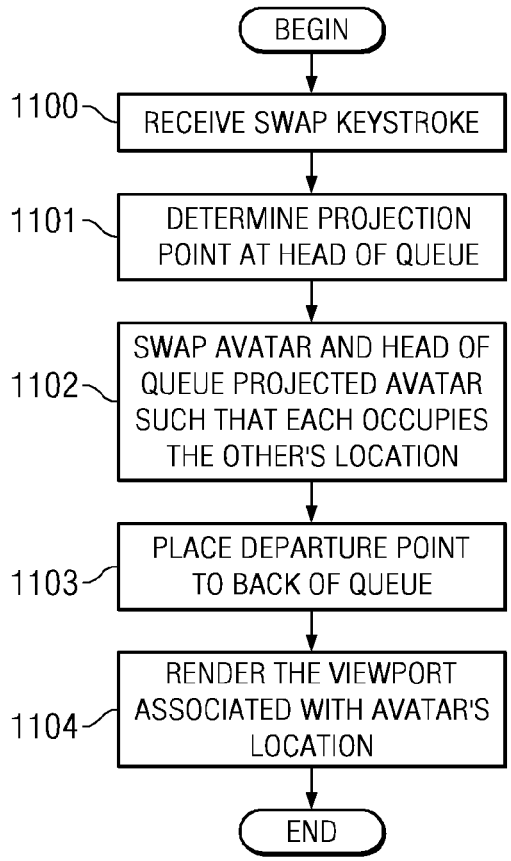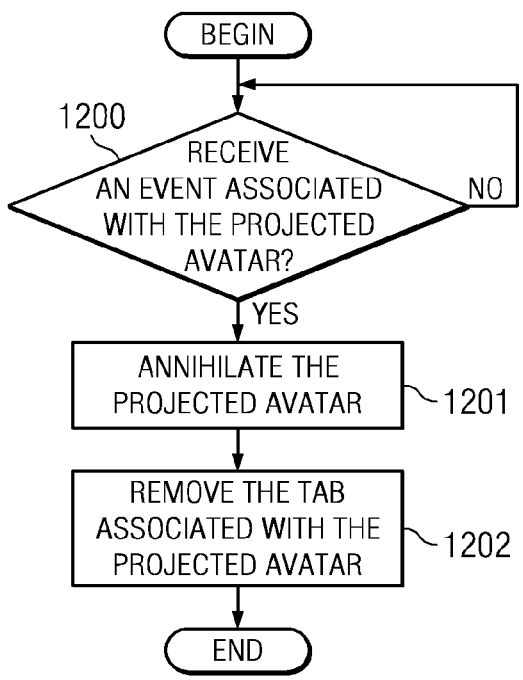

METHOD AND APPARATUS FOR MOVING AN AVATAR IN A VIRTUAL UNIVERSE

CROSS REFERENCE TO RELATED APPLICATIONS

This application is related to commonly assigned and co-pending U.S. patent application Ser. No. 11/839,898 entitled "METHOD AND APPARATUS FOR PREDICTING AVATAR MOVEMENT IN A VIRTUAL UNIVERSE," and U.S. patent application Ser. No. 11/839,884 entitled "METHOD AND APPARATUS FOR SPAWNING PROJECTED AVATARS IN A VIRTUAL UNIVERSE," filed on even date herewith and hereby incorporated by reference.

BACKGROUND OF THE INVENTION

1. Field of the Invention

The present invention relates generally to a computer implemented method, apparatus, and computer usable program code for navigating in a virtual universe. More specifically, the present invention relates to tabbed controls in a user interface to permit teleporting between virtual universe locations.

2. Description of the Related Art

Modern uses of networked computers leverage the graphics processing power of client computers. The client computer is a computer typically assigned the task of supporting user input and displaying output to a user. Many users reach online environments called virtual universes by using a client computer. A virtual universe permits a user to adopt an avatar or a graphical representation of the user. The user has the power to move the avatar, have the avatar interact with objects, and have the avatar interact with the avatars of other users.

A virtual universe depends on a coordinate system to create anchor points where avatars and objects may be located for purposes of rendering the avatars and objects to each user's computer. Coordinates are two or more units that define a position in a virtual universe. The coordinates may be a Cartesian set of points that define planes and altitudes, however, global coordinates are also known to be used. Typically, an object has a location referenced by a triplet of numbers, and optionally a region or other descriptor of a subset of space within the virtual universe.

In addition to a location, proper rendering of an object or avatar may depend on an orientation or attitude of the object or avatar. An attitude is an overall orientation of an object or avatar in relation to a plane or a vector. For example, an attitude may be based on a number of degrees that an object is offset from a positive direction along a coordinate axis. For virtual universes that form analogs to a real world, north and south compass points may correspond to a positive direction along a first axis and a negative direction along the axis. East and west may be represented in a similar manner, along a second axis perpendicular to the first axis. A third axis may correspond to height. Attitudes may also include offsets of inclination above a plane.

Some virtual universes are organized to present an avatar within a three dimensional environment. Such virtual universes may provide a "first person point of view." Within a first person point of view, a client computer renders scenery to a two dimensional screen to produce a three dimensional illusion or effect. An example of a three dimensional illusion includes diminishing the size of an object as the object becomes relatively distant from the avatar's position in the virtual world. Another example of a three dimensional illusion is displaying a nearer object as obscuring a more distant object. Each of these illusions is controlled by rendering rules. Rendering rules are a set of rules or steps that a client computer executes to display the two-dimensional image such that the display provides impressions of depth that users expect to see in real life scenery.

Many virtual universes provide a user a teleport feature that permits a user to change an avatar location. The changed location causes a perspective of the avatar to change, and thus changes a screen image of the virtual universe. The perspective may cause objects to be rendered to show the objects at different orientations and distances from the avatar. The perspective may cause formerly rendered objects to be obscured by other objects. Likewise, the perspective may cause formerly rendered objects to be so distant that the objects are not rendered in the second perspective. In this case, a client computer renders a new set of objects to the user's computer display screen.

FIGS. 1A and 1B show a teleportation which results in objects being positioned at different orientations and distances relative to the avatar. An avatar 101 at a first location has a first perspective bounded by left side 103 and right side 105. Left side 103 may correspond to a left-most edge of a window, display, or other limitation on a user's client computer. Similarly, right side 105 may correspond to a right-most edge of a window, display, or other limitation on a user's client computer. Between left side 103 and right side 105, some objects may be located. To the extent that rules of rendering are met (atmospheric effects and intervening surfaces), a client computer may display two objects which represent aspects of cube 107 and sphere 109.

FIG. 1B shows the effect of teleportation or other movement from a former location 110 to teleported location 111. The avatar now sees cube 107 nearby obscuring sphere 109. The avatar's perspective changes because the location and attitude of the avatar change.

Teleporting permits a user to see much of a virtual world quickly. Unfortunately, the user may have no graphical data concerning a past teleport source location. As a result, the user may not adequately understand the content of virtual objects near to a prior location.

Thus, a need exists to provide a user with better visual indications of past presence, or future predictions of presence, at a location in a virtual universe.

SUMMARY OF THE INVENTION

The present invention provides a computer implemented method, apparatus, and computer usable program code for moving an avatar in a virtual universe. A computer renders a first viewport in a computer display. The first viewport may comprise a first tab, a first coordinate, and a first attitude. A first object is rendered based on the first coordinate and the first attitude in a region. The computer renders a second tab. The computer receives a user selection corresponding to the second tab. Next, the computer renders a second viewport comprising a second coordinate and a second attitude. The computer renders the second object in a computer display from a perspective distinct from the first viewport. In addition, the computer registers the avatar as associated with the second coordinate and second attitude in the virtual universe, wherein the first tab is a visual indication of movement history.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B is a flowchart of steps to teleport an avatar in accordance with an illustrative embodiment of the invention;

FIG. 9A shows an avatar and three projected avatars in accordance with an illustrative embodiment of the invention;

FIG. 9B shows a queue of projected avatar locations stored within a computer in accordance with an illustrative embodiment of the invention;

FIG. 10 is a flowchart of a virtual universe host swapping an avatar with an associated projected avatar;

FIG. 11 is a flowchart of steps that may be performed on a client computer in accordance with an illustrative embodiment of the invention; and FIG. 12 is a flowchart of steps to annihilate a projected avatar in accordance with an illustrative embodiment of the invention.

DETAILED DESCRIPTION OF THE PREFERRED EMBODIMENT

Figure 2:
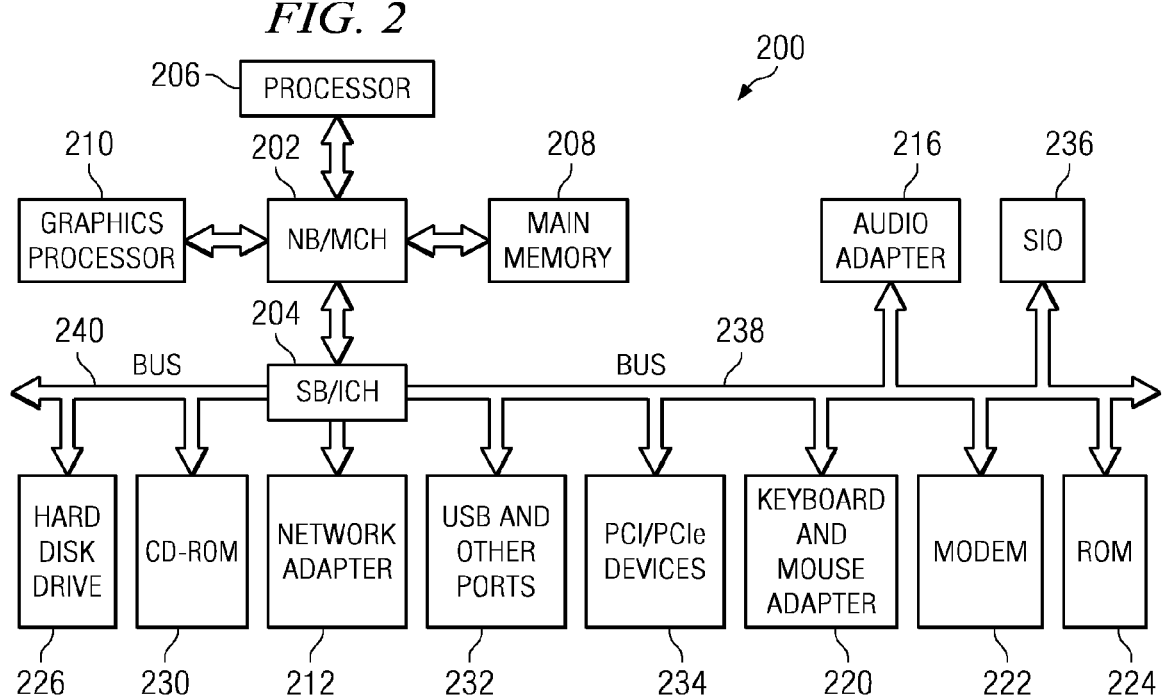
FIG. 2 is a data processing system in accordance with an illustrative embodiment of the invention.

With reference now to the figures and in particular with reference to FIG. 2, a block diagram of a data processing system is shown in which aspects of an illustrative embodiment may be implemented. Data processing system 200 is an example of a computer, in which code or instructions implementing the processes of the present invention may be located. In the depicted example, data processing system 200 employs a hub architecture including a north bridge and memory controller hub (NB/MCH) 202 and a south bridge and input/output (I/O) controller hub (SB/ICH) 204. Processor 206, main memory 208, and graphics processor 210 connect to north bridge and memory controller hub 202. Graphics processor 210 may connect to the NB/MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ is a trademark of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the present invention can be performed by processor 206 using computer implemented instructions, which may be located in a memory such as, for example, main memory 208, read only memory 224, or in one or more peripheral devices.

Those of ordinary skill in the art will appreciate that the hardware in FIG. 2 may vary depending on the implementation. Other internal hardware or peripheral devices, such as flash memory, equivalent non-volatile memory, and the like, may be used in addition to or in place of the hardware depicted in FIG. 2. In addition, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted example in FIG. 2 is not meant to imply architectural limitations. For example, data processing system 200 also may be a tablet computer, laptop computer, or telephone device in addition to taking the form of a PDA.

The aspects of the illustrative embodiments provide a computer implemented method, apparatus, and computer usable program code for making persistently visible representations of one or more viewports of a virtual universe. For example, upon teleporting to a new location, a new tab may be added at the periphery of a viewport window. The tab can be configured to show an image of the associated viewport, as well as respond to a pointer selection. Consequently, a user may quickly assess some of the contents or purpose of a virtual universe environment depicted by a viewport that is reached through selection of the tab. Further aspects permit predicting locations in a virtual universe that a user may wish to teleport her avatar to. The illustrative embodiments may receive a user input and move an avatar's position accordingly by teleportation. In addition, some user-controls may expire and be removed after a sufficient latency period.

Figure 3:
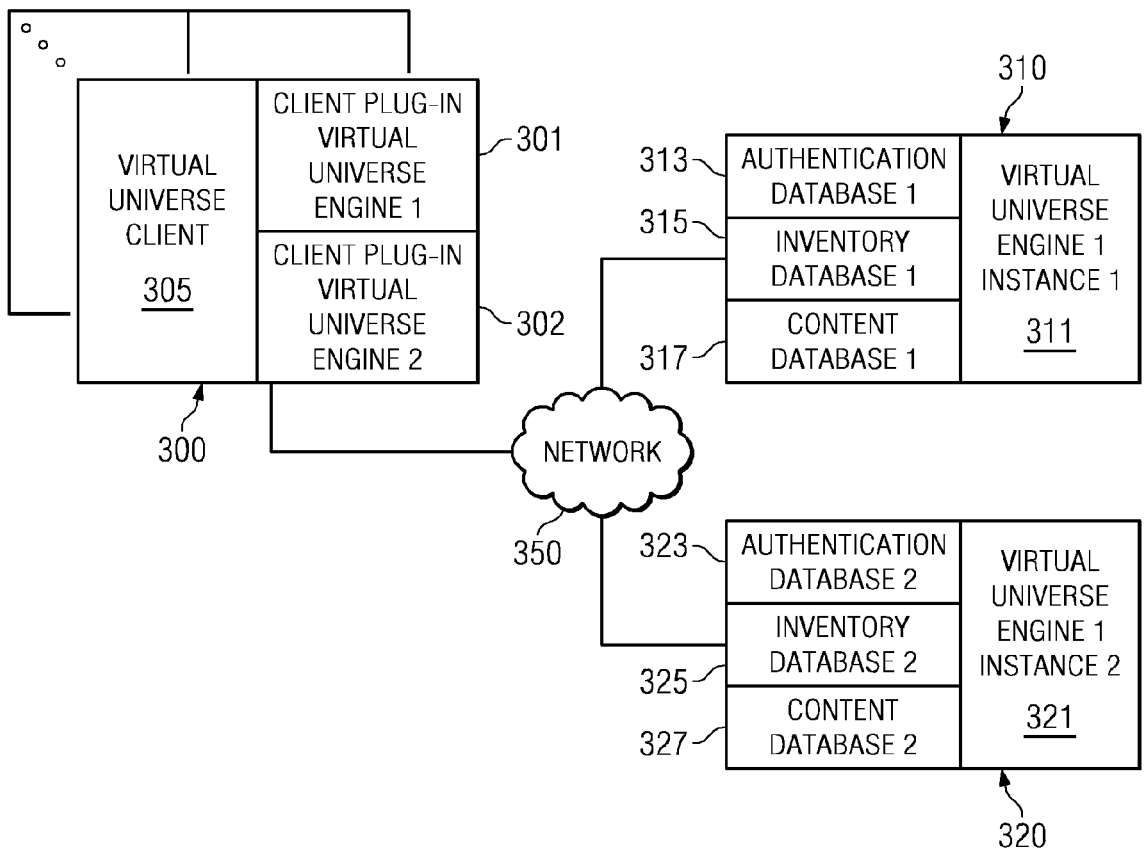
FIG. 3 is a diagram of a client computer interacting with computers hosting virtual universe engines in accordance with an illustrative embodiment of the invention.

FIG. 3 shows a client computer interacting with computers hosting a virtual universe engine in accordance with an illustrative embodiment of the invention. Client computer 300 supports executing software, including virtual universe client 305. Virtual universe client 305 provides communication and rendering functions that are common to virtual universes made by different sources. The client computer 300 may be, for example, data processing system 200 of FIG. 2. The client computer may be one of many that interconnect to one or more virtual universes over network 350. Network 350 may be, for example, an ad hoc network or the Internet, among other networks.

In addition to virtual universe client 305, the client computer may also run a client plug-in software. The client plug-in exchanges data with the virtual universe client and provides extended features to the operation of virtual universe client 305. A client plug-in may provide a feature that corresponds with a feature supported in a virtual universe engine. For example, a virtual universe provider may want to provide real-time voice exchanges between a virtual universe and a virtual universe client. A plug-in for that virtual universe may provide computer instructions to a processor in order to assemble packets and provide routines to handle delay and jitter in packet transmission. Again, a processor for virtual universe host 310 may be as described by processor 206 of FIG. 2. Thus, client plug-in virtual universe engine 1 301 may support functionality of a virtual universe engine 1 shown as virtual universe engine 1 instance 1 311. Additional client plug-ins, for example, client plug-in virtual universe engine 2 302 may be provided for additional virtual universes.

Virtual universe engine 1 instance 1 311 interacts with supporting databases. Each database may record data in a permanent storage of the processing system, for example, a hard drive such as hard disk drive 226 of FIG. 2. Thus, authentication database 313 may permit proper admission of a client computer to connect to features of virtual universe engine instance 311. In addition, any inventories associated with each avatar may be looked up, modified, and otherwise manipulated within inventory database 1 315. In similar fashion, content database 317 may be accessed to provide data concerning textures and shading to be applied to surfaces of virtual universe objects.

The example network environment shown here includes second virtual universe host 320. Like virtual universe host 310, second virtual universe host 320 provides authentication database 2 323, inventory database 2 325, and content database 2 327. However, the databases of virtual universe host 320 may be under a separate authority and require authentication credentials and processes different than those credentials in use at virtual universe host 310.

Figure 4A:
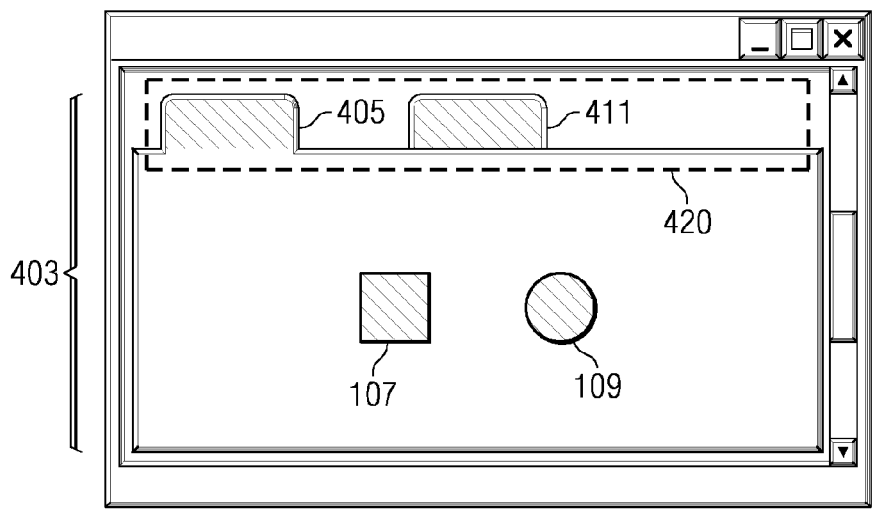
FIGS. 4A and 4B show a first embodiment user interface and second embodiment user interface, respectively, in accordance with illustrative embodiments of the invention.

FIG. 4A shows a first embodiment user interface in accordance with an illustrative embodiment of the invention. A client computer renders window 401 to a user via a computer display. A computer display is an imaging panel that provides color or monochrome images. A computer display may be, for example, LCD panels, cathode ray tubes, organic light emitting diode arrays, or any other visible imaging system. The illustrative FIG. 4A depicts a window with a scroll bar, a status bar and windows management buttons. However, it is appreciated that a window may alternatively provide access to such functionality via, for example, menus and the like. Consequently, peripheral controls may be reduced to some extent in alternate embodiments of the invention. As explained above, the client computer may be an instance of data processing system 200 of FIG. 2.

Within window 401, the client computer displays a full view 403 with an associated tab 405. A display may receive a graphics signal by virtue of connection to graphics processor 210 of FIG. 2. The client computer may display second tab 411. The client computer displays a scene based on at least one coordinate and an attitude. The coordinates and attitude correspond to the location of the avatar in the virtual universe and relative positions of objects in relation to the avatar. In addition, display-rendered shading and any sky or other textures may depend on the orientation of the avatar as established by the attitude of the avatar.

Figure 1A:
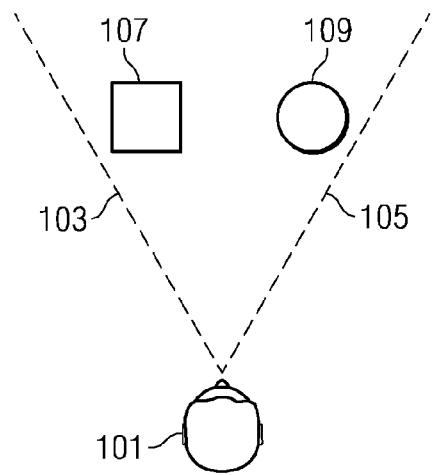
FIGS. 1A and 1B are top-down views of three dimensional perspectives of objects in a virtual universe in accordance with an illustrative embodiment of the invention.
Figure 1B:
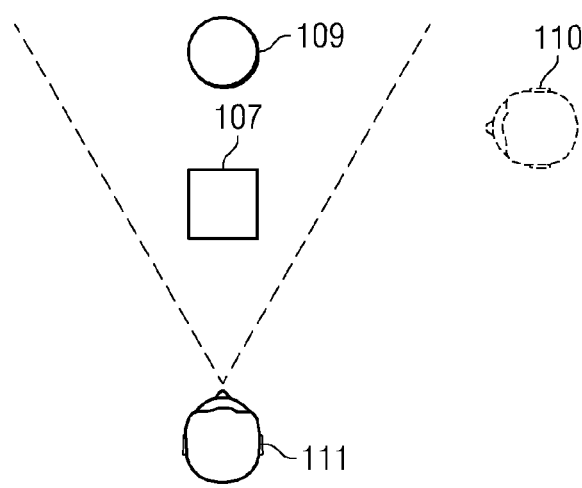

Color effects in the tabs can provide a user with a visual indication of movement history. In other words, the tab associated with visible full view 403 shows a color that is the same as a color visible within the full view 403. Similarly, tab 411 shows a color associated with a former location of the avatar, for example, a teleportation source location. A client computer may color tab 405 to be similar to a visible surface of an object representative of the full view as an aid to future navigation. For example, tab 405 may be rendered to have a color in common with sphere 109 as rendered for a perspective depicted in FIG. 1B. The scene rendered in full view 403 corresponds with the view shown in, for example, FIG. 1A, to the extent that cube 107 is positioned to the left of sphere 109. Thus, a viewport is the two-dimensional representation of objects in the virtual world from a perspective of the avatar. A perspective is the combination of the avatar location and attitude. In addition, a perspective may be modified by a stance of the avatar. The viewport may include menus, controls, and messages associated with the viewport to provide information pertaining to the contents of the viewport and to allow user actions upon the viewport.

Figures 4B, 5:
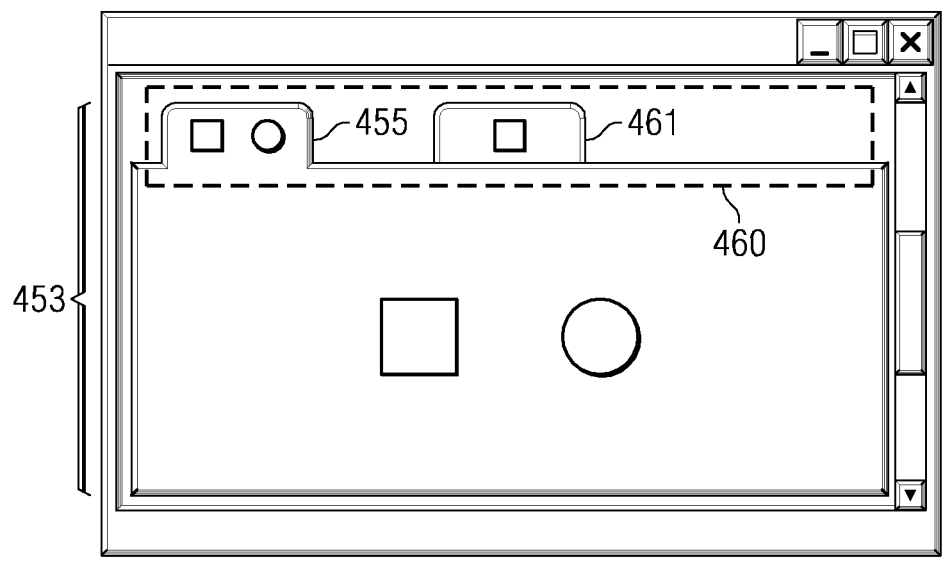
FIG. 5 shows a data representation of movement history of an avatar in accordance with an illustrative embodiment of the invention.

FIG. 4B shows a second embodiment user interface in accordance with an illustrative embodiment of the invention. Like the view full view port 403 of FIG. 4A, FIG. 4B shows window 450 that includes full view 453. However, in contrast to FIG. 4A, tab 455 also shows a miniature image of the full view or a portion of the full view. A tab and objects or colors displayed within the tab is persistent in the sense that the client computer may prevent additional viewports, pop-ups, dialogs and the like from obscuring the tab, to the extent such additional viewports, pop-ups and dialogs are controlled by a virtual universe client or plug-in. Such tabs are located in tab selection area 420.

The client computer similarly displays tab 461. Tab 461 includes a miniature image of a full view that is obscured by full view 453. In other words, the display of full view 453 takes precedence over the display of a full view that corresponds with tab 461. For example, tab 461 can include a miniature image of a full view for the scene of FIG. 1B. A miniature image is an image that has a dimension smaller than a corresponding full view associated with the miniature image, such as to fit within a tab selection area. Tab selection area 460 is a zone within window 450 where tabs may be placed. The zone is substantially narrower in a height dimension as compared to a dimension of a corresponding full view. The miniature image may be a static snapshot from a point in time, a periodically updated static snapshot at specific points in time, or a moving image updated continually. A tab is a generally rectangular area displayed adjacent to a full view. The presence of a thin band of intervening or contrasting pixels does not cause a rectangular area to cease to be adjacent to a viewport.

A tab may correspond to executable code that, when running on a microprocessor, detects a pointer device activity that maps to the pixels or other geometry within the tab. Consequently, a mouse click on a tab may be used to request that a client computer completely display a viewport associated with the tab.

Objects, such as cube 107 of FIG. 1, are geometric shapes defined within the virtual world to have at least one surface. An object may be, for example, a Euclidean solid as represented in the virtual world. A complex object may be made by stretching, intersecting and otherwise combining solids together. Thus, an object may be comprised of several sub-objects. Some virtual universes compose objects from one or more faces of a polygon. Thus, the cube 107 of FIG. 1 may be composed of six square polygons. More complex figures may be created by combining many relatively small polygons into a polygon mesh.

Ultimately, a virtual universe is the collection of all objects of the virtual universe and the locations, if any, associated with the objects. A virtual universe may include additional attributes, such as associating objects with textures and sounds, as well as rules under which real-world physics are simulated or modified.

FIG. 5 shows data representation 500 of a movement history of an avatar in accordance with an illustrative embodiment of the invention. Each record within the data may be represented by a row underneath the column headings 501. Each row may include details concerning a viewport. For example, row 511 may comprise coordinates (300,400), a region corresponding to "Chient," and an attitude of 180 degrees in relation to reference vector in the virtual world. Each row may correspond to a viewport having a visible aspect displayed in a tab in a window, for example, window 401 of FIG. 4A. Tabs may be arranged sequentially left to right in the order that the associated viewport was first visited by the avatar. Thus, an earliest viewport rendered to the window may be the viewport corresponding to row 511.

Similarly, a second tab may correspond to a viewport that was visited second in time after the viewport associated with row 511. The second-in-time viewport may be associated with row 512. Thus, the coordinates visited second in time are (100,200).

FIG. 6A is a flowchart of steps to teleport an avatar in accordance with an illustrative embodiment of the invention. Initially, a user logging in to a virtual universe on a client computer may select a starting location in the virtual universe. Consequently, a client computer may receive a user choice of coordinates and attitude (step 601). A user may accept a default location or other starting point that is offered by a virtual universe host computer, such as, for example, host computer 310 of FIG. 3. Next, the client computer renders a viewport and first tab corresponding to the user choice (step 603). A user may select a second coordinate or coordinates and a second attitude. In response to the second coordinate selection, the client computer may render a second tab (step 604). Each tab may support a user selection such as hovering or clicking a mouse pointer located within the tab.

Next, the client computer may periodically check to determine whether user input is received (step 605). If the client computer receives no user input, then the client computer renders any environment changes that occur within applicable zone of an active viewport (step 611). Such environment changes occur, for example, when objects are added to the zone, or when avatars or other objects move within the zone. As another example, the environment may change when illumination or sky changes within the zone.

If the client computer detects a user input, then the client computer determines whether a user selection of a second tab occurred (step 607). As explained above, tabs may be located along a boundary of a viewport. If the user does not select a second tab, the client computer renders any changes responsive to coordinates or attitude changes requested by the user (step 613). Otherwise, the client computer renders a viewport based on a second coordinate and second attitude corresponding to the second tab (step 619). The second coordinate is sufficiently distant from the first coordinate, in relation to objects within the zone, that the perspective from the second coordinate is distinct from the perspective associated with the first viewport. To be distinct, a perspective so differs from a previous perspective that a user would not confuse a teleportation jump with movement made by walking, flying, or other continuous movements of the avatar.

In addition to the rendering step 619, aspects of the avatar are teleported to optionally permit viewing of the avatar by third party users. The client computer may register the avatar as associated with the second coordinate and the second attitude (step 621). Registering may mean that the client computer sends a signal to a virtual universe host indicating that a teleportation has occurred such that the avatar occupies a location defined by the second coordinate and second attitude. Registering may also include any confirmation from the virtual universe host directed to the client computer. A registration may indicate that no collisions or other inconsistency occurred between the avatar and objects hosted by the virtual universe host. Such registration confirms that the teleportation has completed successfully. If a virtual host detects that an object occupies a target location of a teleportation, the virtual host may offset the target location enough so as to avoid any conflict by the object and the avatar. By so doing, the virtual host may place the avatar next to the object. Steps 619 and 621 may be performed in any order.

The second coordinates and second attitude of step 619 may be in a region different from the region for the coordinates and attitude of step 601. A region is a volume in the virtual universe served by one of several processors. Such processors may divide the task of the virtual universe engine at virtual universe host 310 of FIG. 3.

Responsive to the avatar being associated with the second coordinate, the client computer may render a miniature image in a first tab. The miniature image is based on the viewport image or current view from the first location associated with the first viewport. Thus, the client computer can make the state of the viewport visible as a persistent history of teleportation movement. Nevertheless, a step of rendering the miniature image may occur as part of the rendering step 603.

An illustrative embodiment of the present invention may also remove an association of the avatar with a first coordinate as part of step 621 registering. Removing the association may entail the client computer transmitting a message to a corresponding virtual universe host such that the virtual universe host no longer stores a coordinate in association with the current avatar position. The virtual universe host may respond by deleting or otherwise unallocating memory storage related to the first coordinate.

In addition to using the tabs, the history of teleports may be navigated through keystrokes at the client computer. For example, a user may enter a backspace or left arrow key to navigate an avatar to a previous location. This action permits the displayed perspective to change, and may make a former tab and viewport active on screen. Similarly, another keystroke command may be used to navigate to a location that had been reached after visiting the most recently teleported location. For example, if the user had resumed navigation by navigating 'back' to the viewport associated with location in row 511 of FIG. 5, the forward navigation keystroke may trigger a selection of the location described in row 512 of FIG. 5. This navigation sequence occurs by the method described above because row 512 is sequentially next after row 511 by virtue of row 511 being the source of a teleportation made earlier in time to the location corresponding to row 512. It is appreciated that a keystroke or keystroke command may be a combination of keys struck on a keyboard wherein keys are depressed during a common interval of time, or wherein keys are depressed in sequence. Similarly, other input devices may be used, such as mouse scroll wheels, or mouse buttons, or mouse, trackball, or other device gestures.

FIG. 6B shows a continuation of the steps of FIG. 6A, in accordance with an illustrative embodiment of the invention. A user may desire to set a condition to cause a host computer to inform the user of a changed condition related to a location at a teleportation source. Thus, the client computer determines whether a user set a condition to cause an event signal to be sent based on changes associated with a viewport associated with the location (step 650). Provided the user does not set a condition, processing terminates.

On the other hand, if the user sets a condition, the client computer sends the condition description to virtual universe host (step 655). A condition may be, for example, the detection of a chatting avatar within a distance of the location associated with the viewport. A condition description may be based on a user-entered description such as, "inform me when an avatar chats." An event is a signal sent from the host computer indicating the nature of the condition. A condition may be true that an avatar chats nearby to the location. In addition, the host computer may report further details, such as, the name of the chatting avatar and which of the viewports or tabs is associated with the event.

Next, the client computer may continuously test for whether it has received an event based on the condition (step 657). Absent receiving the event, the computer returns to step 657. If the outcome to step 657 is true, then the client computer displays a message to the user (step 659). The message may be, for example, "Powder Grut is chatting at location referenced by tab 3." Processing terminates thereafter.

An alternative to step 659 may include a virtual universe sending details concerning a scene corresponding to the location of a viewport. The virtual universe can send such details as part of coordinating a teleport of the avatar to the location associated with the event. The client computer can receive such details, and accordingly render the viewport associated with the location of the event. The coordinated teleportation in association with satisfying a user-established event is called a "flip." "Flipping" describes the automatic rendering in the client computer of a viewport associated with the event. A user may select this alternative to step 659 when the user sets a condition at step 650. In addition, the user may also indicate a preference to flip in addition to the client computer performing step 659.

A user may establish a number of user preferences that permit a virtual universe host to determine a list of locations and/or events that are suited to the user's tastes. In addition, a virtual universe host may establish predictions on the basis of teleportation destinations of other users, even users similar to the particular user. Each event location and the degree that it satisfies user preferences is weighted in applicable categories and summed. The sum applicable to the location is then compared to sums applicable to other locations.

Each event's location, and locations related to the user, may be weighted in accordance with a user's preferences and event scheduling to permit the virtual universe host to list events in rank order. The virtual universe host may be, for example, virtual universe host 310 of FIG. 3. Each location that satisfies a criterion may form a prediction. A prediction is a value assigned to a location which is based on a user preference. A prediction may be associated with a user's likelihood of making a future location selection as a destination for teleportation.

A user responds to a prediction by providing instructions through a user interface. The user interacts with a user interface by providing inputs or instructions. An instruction is a signal received by a computer based on a user selecting a user-control with a mouse, keyboard or other user input device. An instruction may correspond to a user-control.

Figure 7A:
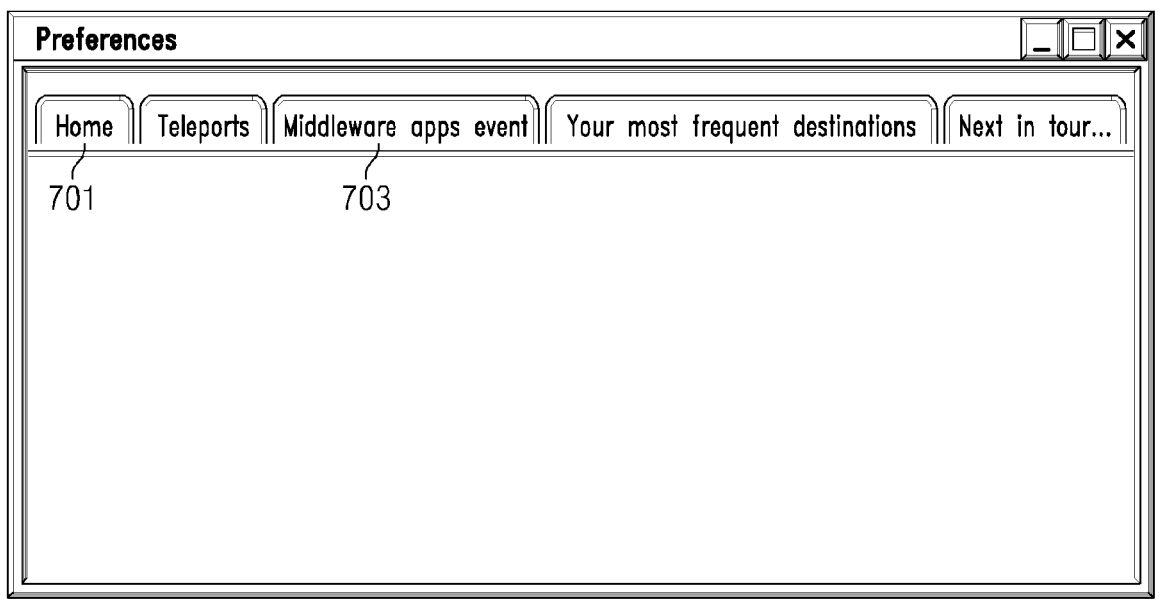
FIG. 7A shows a sequence of locations appearing in a set of user-controls in accordance with an illustrative embodiment of the invention.

FIG. 7A shows a sequence of locations appearing in a set of user-controls in accordance with an illustrative embodiment of the invention. User-controls are a part of graphical user interface 700. Each user-control may correspond to a prediction. User-control 701 is marked "home." FIG. 7A shows the user-controls as tabs. User-controls may alternatively be, for example, a button, a menu item, or any other graphical user interface. A client computer displaying such user-controls may receive an instruction from a user corresponding to the user-control. For example, a user may click a mouse while a cursor points to user-control 703 marked "middleware apps event." The client computer may transmit a message to a virtual universe host that indicates the user selected a location related to the "middleware apps event." The virtual universe host may, in response, teleport the avatar of the user to the location associated with user-control 703.

Figure 7B:
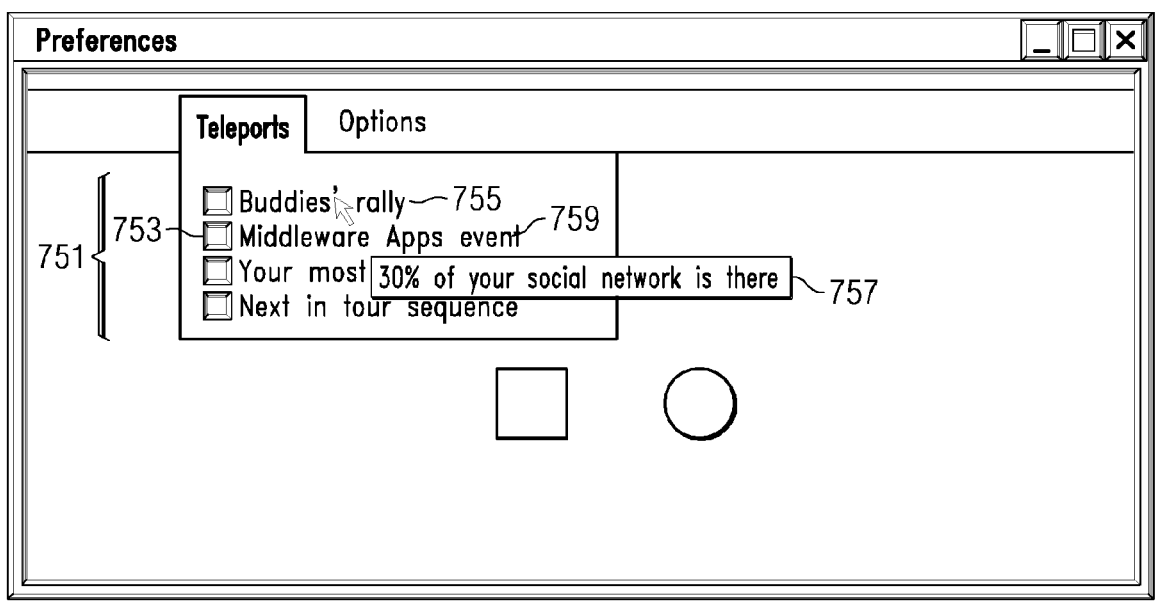
FIG. 7B shows an alternative illustrative embodiment of a graphical user interface in accordance with an illustrative embodiment of the invention.

FIG. 7B shows an alternative illustrative embodiment of graphical user interface 750 in accordance with an illustrative embodiment of the invention. Like the graphical user interface 700 in FIG. 7A, graphical user interface 750 exposes a set of user-controls to serve as targets for mouse inputs or other user inputs. In this case, the user-controls are menu items 751 on a menu. Menu items 751 and other controls may be accessed by using keyboard shortcuts.

FIG. 7B shows a name associated with an event or a location in a virtual universe. Each name is presented as a prediction. The meaning and purpose for visiting each location may be amplified by an attendant teleportation rationale. A teleportation rationale is a value the virtual universe host assigns each location that corresponds with a prediction. Ordinarily, the teleportation rationale assigned to a first prediction will vary from a teleportation rationale assigned to a second prediction. Consequently, the teleportation rationale may serve as a basis to order the user-controls in a sequence from highest likelihood of user selection to lowest likelihood of user selection.

A teleportation rationale may be supported by a user-language explanation of the basis for the priority of the location in the list of predictions. For example, location 755, "buddies' rally" has a user-language explanation or textual explanation of "30% of your social network is there." Such an explanation may rely upon a user's affiliation with operators of other avatars to determine that 30% of the user's peers have teleported to the location, or are within a tolerance distance from the location. Consequently, the client computer may provide indicia corresponding to the teleportation rationale proximate to the first user-control. Indicia is a graphical or textual indicator of the desirability of an event and associated location to be targeted by teleportation. By 'proximate' it is meant that a textual explanation or other visual explanation of desirability of the location is placed near or within the applicable user-control. In this case, the indicia appears within a mouse-hovering caption as textual explanation 757. The client computer may display the mouse-hovering caption when the pointer is placed over the applicable user-control, which is "buddies' rally" 755, in this example. Accordingly, textual explanation 757 "30% of your social network is there" is displayed by client computer to assist a user in making a choice of a future location selection.

Menu items 751 may also incorporate a set of user-controls used to collect or receive one or more user preferences. User preferences are inputs by a user that indicate criteria for including, weighting, excluding, or otherwise sorting one or more locations for the purpose of offering such locations as predictions. Menu items 751 provide one way for a virtual universe host to collect locations or criteria that a user desires to exclude from predictions. As an example, a user may not be interested in "middleware apps event" 759. Consequently, a user may click a mouse to select opt-out control 753 or checkbox adjacent to user-control 759 "middleware apps event." The algorithm for weighting locations is described further below.

In addition to text, an indicia may include numeric text. For example, the client computer may determine that among the 10 people that are peers to the user, 3 of those peers have moved their avatars to the location that the client computer offers as a prediction. The indicia may also be numeric text, which may be an estimate of probability assigned to the teleportation rationale.

Still a further alternative indicia may be a bar having a length corresponding to a calculated likelihood of a user selection. A bar is any graphic image that may be used as an indicator for a bar graph. A calculated likelihood of a user selection is a value assigned to a location on the basis of one or more user preferences. Accordingly, a user may quickly focus on a pair of options rated 40% and 50%, and discount a pair of options rated 3% and 7%, on the basis of the client computer displaying a bar at or near each user-control. Thus, each bar may have a length that corresponds to a percentage.

Figure 8A:
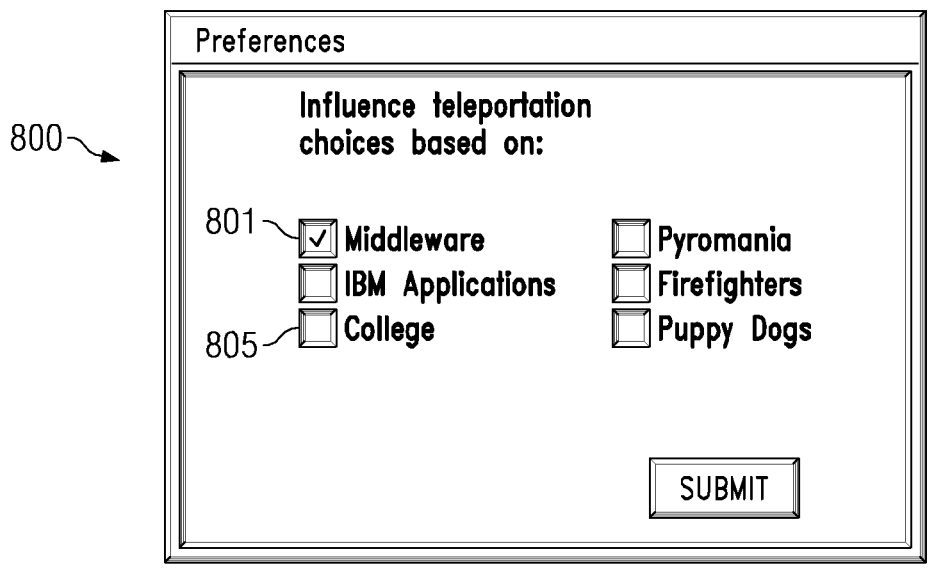
FIG. 8A shows a list of categories or keywords that may correspond to location options in accordance with an illustrative embodiment of the invention.
Figure 8B:
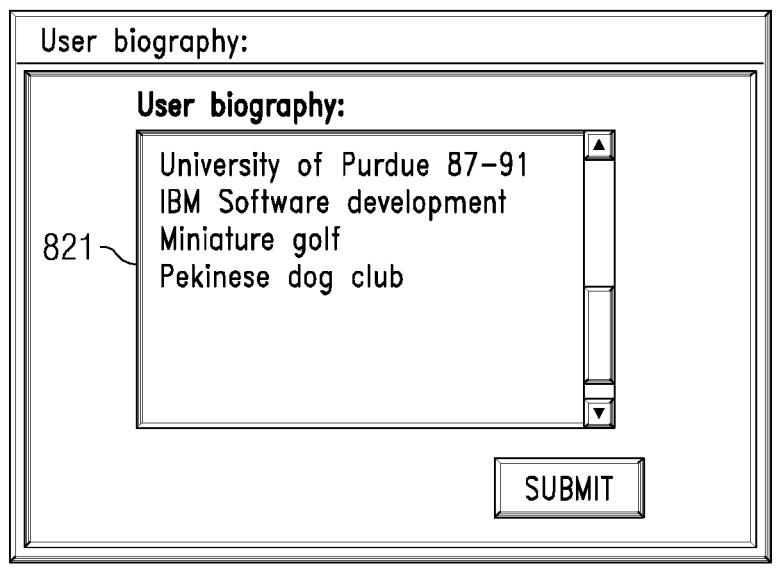
FIG. 8B shows an alternative user interface to receive user preferences through the entry of a biography, in accordance with an illustrative embodiment of the invention.
Figure 8C:
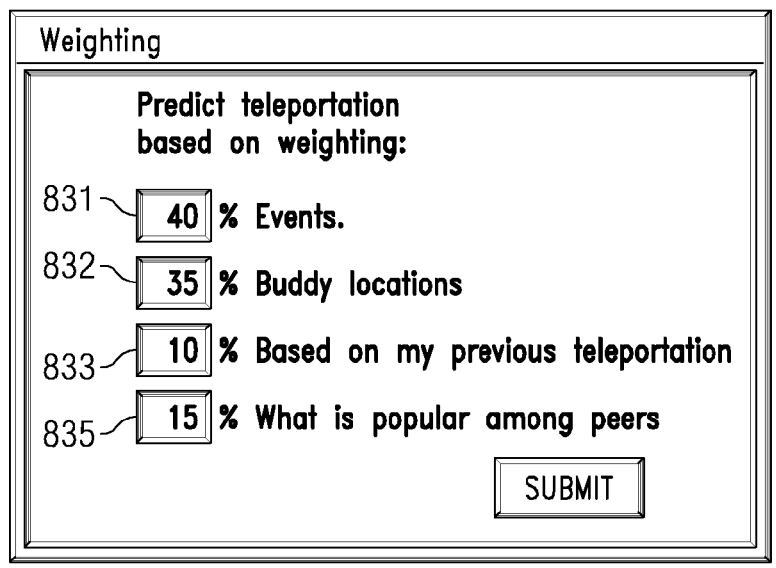
FIG. 8C shows a set of user preferences for establishing weights from a group of predictor influences in accordance with an illustrative embodiment of the invention.

The method for receiving user preferences is shown with respect to FIGS. 8A-8C. In addition, the user preferences thereby collected support calculations of likelihood of user selection with respect to one or more locations. A calculation of likelihood of user selection is explained further below.

FIG. 8A shows a list of categories or keywords that may correspond to locations in accordance with an illustrative embodiment of the invention. A client computer may offer user interface 800 in response to a user indicating a desire to enter or update criteria used in ranking the locations. For example, a user has selected keyword 801, "middleware." The choice of middleware is received by the virtual universe host and established among a list of keywords associated with the user. Keywords left unchecked, for example keyword 805, "college," may not influence virtual universe host in establishing the list of keywords associated with the user.

FIG. 8B shows an alternative user interface to receive user preferences through the entry of biography 821, in accordance with an illustrative embodiment of the invention. Each word that a user enters in biography 821 may be added to a list of keywords associated with the user.

FIG. 8C shows a set of user preferences for establishing weights from a group of predictor influences in accordance with an illustrative embodiment of the invention. Since there are several categories of influences that may help predict a user selection among predictions, a user may be able to provide further guidance by applying weighting factors to each category or class of influences. One class of influences may be a history of a user's teleport destination that correspond to a user's previous choice when the user's avatar is at or near a current location. A user who wishes to avoid being presented predictions along a sequence of teleportations may accordingly weight "based on my previous teleportation" low, as in this example, a weight of 10%. The user enters her preference by entering a value corresponding with input field 833 labeled, "based on my previous teleportation." The same user may place particular emphasis on receiving predictions on the basis of events corresponding to keywords provided in a user's biography and other preferences. In this example, the user applies a 40% weight to input field 831 labeled, "events." Accordingly, a weighting algorithm may place a fourfold weight to events as compared to the category of previous teleportations.

The list of FIG. 8C is not intended to be comprehensive, but merely illustrates an example of many categories that may be assigned user-selected preferences or weights. In addition, the sum of the weights need not necessarily add up to 100%. The list provides a user the ability to assign different values in accordance with the user's individual tastes.

A calculated likelihood of a user selection is a numeric estimate of a user's inclination to select an event or location based on a user's affinities for various subjects. An affinity may be a user preference entered to a dialog box or window such as shown in FIGS. 8A-8C. An affinity may be a user's indication of an avatar or a user that the user considers her buddy. A base calculated likelihood of user selection is a calculated likelihood of user selection unmodified by a weight. A weight is an emphasis on a category or class of events or locations that a user establishes with relation to the category or class. A weight operates as a factor when establishing a calculated likelihood of a user selection to an event or location. Applying a weight or a base calculation of user selection (described below) permits the user entries in FIG. 8C to elevate events of a first category as compared to events of a second category.

A first example of a weight is a historical teleportation weight. A biographical weight is a weight that a user assigns to factor the influence of her biographical words when calculating a likelihood of a user selection. A historical teleportation weight is a weight that a user assigns her previous teleportations when estimating her teleportation choices through a calculation of a likelihood of user selection. Popular among peers field 835 is set to a weight such that a user assigns a factor to buddy locations as an influence to calculating a likelihood of user selection.

A first base calculated likelihood of user selection for an event titled "miniature-golf middleware" which may satisfy two keywords (see FIGS. 8A and 8B). The base likelihood may be the sum from 1 to X of $1/(2X)$, where 'X' represents the number of user preference keywords that match event words. Input field 831, set to a 40% weight, may operate as a weight to apply to event keyword influences. Similarly, a second base calculated likelihood of a user selection associated with a gathering of a user's peers may be calculated. Such a calculation may be based on the number of peers at or near a location divided by the total number of peers. Thus, the calculated likelihood of user selection of a two-keyword-matched-event may be 0.75* (½+¼), and the calculated likelihood of user selection of the 10 of 10 peers at a location may be 1.00. Input field 832, set to a 35% weight, may operate as a weight to apply to buddy location influences. In accordance with the weights of 40% and 35% of FIG. 8C, the first calculated likelihood of user selection is 0.30, and the second calculated likelihood of user selection is 0.35, respectively.

In addition, a user may have made ten teleportations to ten different locations from the avatar's current position. Accordingly, the base calculated likelihood of user selection could be 0.10 for each location on the basis of a calculation based on a count of times teleported to a location divided by a total times teleported from a departure point or source. The third calculated likelihood of user selection can then be the product of 0.10 and the 10% (see input field 833 of FIG. 8C), or 0.01.

In addition to serving as a basis to order user-controls, each calculated likelihood of user selection may also operate as a criterion for removing a viewport or a user-control. For example, in the embodiment shown in FIG. 7A, a tab having a calculated likelihood of user selection of 0.05 may be presented for 5 seconds. As a second example, a tab having a calculated likelihood of user selection of 0.50 may be removed after 50 seconds. In other words, a timeout may expire a period after the corresponding user-control is first rendered. Thus, a criterion may be "has X*100 seconds expired after the rendering of the user-control," where 'X' is the calculated likelihood of user selection associated with the user-control. According, to the second example above, a virtual universe client computer may render a tab. Then, the virtual universe client may time 50 seconds. Finally, the virtual universe client may remove the tab.

A user may prefer to avoid avatar teleportation to an identical destination of like-minded users in the virtual universe. Consequently, a user may prefer to establish a preference that a teleportation to a location of the event be to a location offset from the event location. For example, a user may enter a preference to teleport to events at a location 10 meters north of the event location. Accordingly, a virtual universe host may teleport the avatar to the location 10 meters north of a selected event location, or as near as possible to satisfy a physics rule that prohibits collisions or objects occupying the same volume.

The aspects of the illustrative embodiments permit a user to establish criteria or influences to predict navigation in a virtual universe. The user may be presented events or locations based on a degree of correlation between a user's expressed affinity for subjects and the event or location. Accordingly, a user is presented user-controls to permit teleportation to the predicted user selections. Moreover, the user selections may be presented in an order of a user's likely selection.

The aspects of the illustrative embodiments supports a computer implemented method, apparatus, and computer usable program code for positioning projected avatars within a virtual universe. An aspect of the illustrative embodiments may permit a user to exchange a location of a user's avatar with the location of one or more projected avatars.

FIG. 9A shows an avatar and three projected avatars in accordance with an illustrative embodiment of the invention. A user may position avatar 910 at a location south of cube 907 and sphere 909 in a virtual universe. The user may select additional locations in the virtual universe where the user likes to place an image similar to the avatar. A projected avatar is an object that is a copy of the geometry of an associated avatar. Unlike the associated avatar, the projected avatar may occupy a different location, have a different attitude and/or, have a different rendering effect applied to the surfaces of the associated avatar. The user has positioned projected avatar 911 to the west of the cube and sphere. The user has placed projected avatar 912 to the north of the cube and sphere. The user has placed projected avatar 913 to the east of the cube and sphere.

The user may place each projected avatar by input of a command to a client computer. The command may be a command to project the avatar. A command to project an avatar is a command made to a client computer or to a virtual universe host to project a copy of a user's avatar at a location distinct from the location of the avatar. Each projected avatar, projected avatar 911, projected avatar 912 and projected avatar 913 is located at respective projection points. A projection point is a location that a projected avatar is first placed, or to which the projected avatar is moved. The projection points may be labeled location A, location B and location C.

A client computer that receives a command to project the avatar may transmit a request to place the projected avatar at the projection point to a virtual universe host. The request may optionally include data that indicates that the virtual universe host should apply physics to the projected avatar. Applying physics means that the virtual universe host prohibits a solid object from occupying the same space as the projected avatar. Applying physics may mean that other physical properties are simulated, such as, for example, gravity, the effects of momentum, aerodynamics, and the like. Next, the client computer may render a tab associated with the projected avatar. The tab may be, for example, tab 461 of FIG. 4B. In addition, the client computer may render other aspects of a viewport associated with the projection point, for example, a perspective view of the virtual universe from the vantage of the projected avatar.

Upon receiving the request to place the projected avatar at a projection point, the virtual universe host may associate the avatar with the projection point. In some instances, a user may choose to place the projected avatar at a location offset from the event location or other location. The user may choose a preferred offset from a projection point to place the projected avatar at a position 10 meters north of the actual event location. A user may choose this option in response to being presented predicted teleportation locations. The projected avatar may accordingly avoid being placed in a high traffic area, as may happen in case the event location is associated with a popular event.

The virtual universe host may apply a rendering effect to each projected avatar. The rendering effect is a lighting or coloring effect that affects how the virtual universe host or a client computer controls simulated rays of light falling on the projected avatar surfaces presented in client computer. The rendering effect is distinct from a rendering effect applied to the avatar from which the projected avatar is copied. For example, the rendering effect may be a reduction in the color saturation of each surface of the projected avatar. As a second example, the rendering effect may be an increase in the translucency of surfaces in the projected avatar as compared to the translucency of surfaces of the associated avatar. Still another rendering effect may be to reduce contrast or shadowing present on the surfaces of the projected avatar. The rendering effect to be applied on projected avatars may be selected by a virtual universe operator so that a consistent scheme is created. Consequently, each user of a client computer may be able to distinguish whether an object rendered to her display is an avatar, or a projection of an avatar.

With each creation of a projected avatar, the virtual universe host may assign the rendering effect scheme to the projected avatar. Accordingly, for each client computer that renders a viewport that contains the projected avatar, the virtual universe host may transmit to a client computer the type of rendering effect scheme.

FIG. 9B shows a queue of projected avatar locations stored within a computer in accordance with an illustrative embodiment of the invention. Queue 950 may serve to rank each projected avatar location as a candidate to swap or exchange places with a user's avatar. When a user swaps her avatar with a projected avatar, the user teleports the avatar to the projected avatar's position and replaces the avatar with a projected avatar. The computer may be client computer 300 of FIG. 3, or virtual universe host 310 of FIG. 3. Head of queue 951 is occupied by location B. Middle of queue 952 is occupied by location C. Tail of queue 953 is occupied by location D. Location B, location C and location D are the locations of projected avatar 911, projected avatar 912 and projected avatar 913 of FIG. 9A, respectively. The order of the locations in the queue may be in the order that a user created the projected avatars. Moreover, a projected avatar takes a position at the tail of the queue at about the time that the projected avatar is swapped. Each queue position may include associated avatar unique identifier 960, and associated projected avatar unique identifier 970. Because the projected avatars are associated with the same avatar, an identical avatar unique identifier appears in the avatar field of each queue position.

A user may initiate a swapping of avatar and projected avatar positions in the virtual universe. The user may initiate swapping by triggering a command to swap the avatar or a swap command. A command to swap is an instruction passed to a virtual universe host that identifies the avatar and the projected avatar directly or indirectly. The command to swap may include a user's keystrokes or mouse movements that are received at a client computer. For example, a user may use a keystroke of applying the "ctrl" key and the "tab" key at the same time such that both keys are depressed on the client computer. In response, the client computer may send an indication that the avatar and the projected avatar at the head of the queue are to be swapped. The indication is sent to the virtual universe host as a command to swap.

FIG. 10 shows a flowchart of a virtual universe host swapping an avatar with an associated projected avatar. Initially, the virtual universe host receives a swap command (step 1000). In an instance where more than one projected avatar exists, the virtual universe host may determine a projection point stored at the head of the queue (step 1001). In the example of FIGS. 9A and 9B, projected avatar 911 occupies location B, which is stored in the head of the queue 951. The virtual universe host places the avatar to the projection point (step 1002). The virtual universe host performs placing by teleporting the avatar to the projection point or location B.

Next, the virtual universe host annihilates the projected avatar at projection point (step 1003). The location that avatar 1000 teleported from may now be vacant, that is location A. A departure point is a location that an avatar departs from, as it is teleported. The virtual universe host places a projected avatar at the departure point or location A (step 1004). The virtual universe host may determine if the projected avatar (now at location A) is in view of any client computers (step 1005). The projected avatar is in view if an avatar associated with a client computer has a clear line of sight to the projected avatar within the virtual universe. If the projected avatar is in view of a client computer, the virtual universe host may apply a rendering effect to render the projected avatar as transparent (step 1006). In this case, the virtual universe host applies the rendering effect by transmitting the association of the avatar with the projection point to a client computer. In addition, the virtual universe host may transmit an avatar attitude to the client computer. Alternatively, the virtual universe host may apply a rendering effect to render the projected avatar as translucent. Next, the virtual universe host places the projected avatar to the tail of the queue (step 1007). Processing terminates thereafter.

FIG. 11 shows a flowchart of steps that may be performed on a client computer in accordance with an illustrative embodiment of the invention. Initially, a client computer receives a command to swap the avatar with a projected avatar (step 1100). The command may be, for example, a mouse click on a tab corresponding to the projected avatar. The command may be, for example, a keystroke combination that selects the projected avatar with which to swap. Next the client computer determines which projection point is at the head of the queue (step 1101). Queue may be, for example, queue 950 from FIG. 9B. Next, the client computer swaps the avatar and the head of queue projected avatar such that each occupies the location of the other (step 1102).

The client computer also adjusts the queue. The departure point is now the location of the projected avatar. Next, the client computer places the departure point to the back of the queue (step 1103). The client computer renders a viewport associated with the avatar location (step 1104). The viewport is active in the sense that commands to animate, move, and reconfigure the avatar, are performed to render the view shown in the viewport from a perspective of the new location of the avatar. Processing terminates thereafter.

FIG. 12 is a flowchart of steps to annihilate a projected avatar in accordance with an illustrative embodiment of the invention. Initially, the client computer receives an event associated with the projected avatar (step 1200). The event may be, for example, an expired timer. A second example of an event may be a command entered by a user. As a third example, the event may be a user logging off of a session with the virtual universe host. In the absence of receiving the event, the client computer may continuously check whether an event is received.

Next, given a positive result to step 1200, the client computer annihilates the projected avatar (step 1201). This step may involve removing the projected avatar from a queue as well as indicating to a virtual universe host to remove the projected avatar from the virtual universe including any inventory with which the projected avatar may be associated. A negative result to step 1200 causes the computer to re-execute step 1200. Next, the client computer removes the tab associated with the projected avatar (step 1202). Processing terminates thereafter.

The command to annihilate the projected avatar may come in many forms via a number of user interfaces. For example, a tab may contain an annihilate button. A user may use a mouse or other pointing device to select the button with a mouse click. Thus, the annihilate command may be a mouse click on the annihilate button.

The illustrative embodiments permit a user to create projected avatars in a virtual universe as well as viewports used to access the projected avatars. The illustrative embodiments may enable a quick way to rotate through a sequence of projected avatars by swapping locations of an avatar with each of several projected avatars. In addition, features may provide for displaying tabs containing compact representations of a teleportation history. A client computer that displays such tabs responds to user inputs such that a tab selection triggers a return to a teleport source location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to move an avatar in a virtual universe, the method comprising:
   rendering a first viewport in a computer display, the first viewport comprising:
      a first tab;
      a first coordinate; and
      a first attitude wherein a first group of at least one object is rendered based on the first coordinate and the first attitude in a first region;
   rendering a second tab;
   receiving a user selection corresponding to the second tab;
   rendering a second viewport comprising a second coordinate and a second attitude wherein a second group of at least one object is rendered in a computer display from a second perspective distinct from a first perspective of the first viewport, in response to receiving the user selection; and
   registering the avatar as associated with the second coordinate and second attitude in the virtual universe, wherein the first tab is a visual indication of movement history.

2. The computer implemented method of claim 1, wherein the second perspective corresponds to a second region, and wherein at least one object is rendered based on the second coordinate and the second attitude.

3. The computer implemented method of claim 2 further comprising:
   rendering an image of the first viewport in the first tab as a miniature image.

4. The computer implemented method of claim 3 further comprising:
   receiving a keystroke corresponding to the first tab; and
   establishing the first viewport as active, wherein the second viewport is substantially obscured.

5. The computer implemented method of claim 1, wherein registering the avatar further comprises:
   removing an association of the avatar with the first coordinate.

6. The computer implemented method of claim 1 further comprising:
   rendering a miniature image of the first viewport in the first tab contemporaneously with rendering the second tab.

7. The computer implemented method of claim 6 further comprising:
   receiving an event from a host computer, wherein rendering the miniature image is responsive to receiving the event from the host computer.

8. A data processing system comprising:
   a bus;
   a storage device connected to the bus, wherein computer usable code is located in the storage device;
   a communication unit connected to the bus;
   a processing unit connected to the bus, wherein the processing unit executes the computer usable code to move an avatar in a virtual universe, the processing unit further executes the computer usable code to render a first viewport in a computer display, the first viewport comprising: a first tab; a first coordinate; and a first attitude wherein a first group of at least one object is rendered based on the first coordinate and the first attitude in a first region; render a second tab; receive a user selection corresponding to the second tab; render a second viewport comprising a second coordinate and a second attitude wherein a second group of at least one object is rendered in a computer display from a second perspective distinct from a first perspective of the first viewport, in response to receiving the user selection; and register the avatar as associated with the second coordinate and the second attitude in the virtual universe, wherein the first tab is a visual indication of movement history.

9. The data processing system of claim 8, wherein the second perspective corresponds to a second region, and wherein at least one object is rendered based on the second coordinate and the second attitude.

10. The data processing system of claim 9, wherein the processing unit further executes the computer usable code to render an image of the first viewport in the first tab as a miniature image.

11. The data processing system of claim 10, wherein the processing unit further executes the computer usable code to receive a keystroke corresponding to the first tab; and establish the first viewport as active, wherein the second viewport is substantially obscured.

12. The data processing system of claim 9, wherein the processing unit further executes the computer usable code to render a miniature image of the first viewport in the first tab contemporaneously with rendering the second tab.

13. The data processing system of claim 12, wherein the processing unit further executes the computer usable code to receive an event from a host computer, wherein the computer usable code to render the miniature image is responsive to receiving the event from the host computer.

14. The data processing system of claim 8, wherein in executing the computer usable code to register the avatar, the processing unit further executes computer usable code to receive a condition; receive an event based on the condition; and render the first viewport after rendering the second viewport in response to receiving the event.

15. A computer program product for moving an avatar in a virtual universe comprising:
    computer usable program code on a computer readable storage medium for rendering a first viewport in a computer display, the first viewport comprising:
    a first tab;
    a first coordinate; and
    a first attitude, wherein a first group of at least one object is rendered based on the first coordinate and the first attitude in a first region;
    computer usable program code for rendering a second tab;
    computer usable program code for receiving a user selection corresponding to the second tab;
    computer usable program code for rendering a second viewport comprising a second coordinate and a second attitude, wherein a second group of at least one object is rendered in a computer display from a second perspective distinct from a first perspective of the first viewport, in response to receiving the user selection; and
    computer usable program code for registering the avatar as associated with the second coordinate and second attitude in the virtual universe, wherein the first tab is a visual indication of movement history.

16. The computer program product of claim 15, wherein the second perspective corresponds to a second region, and wherein at least one object is rendered based on the second coordinate and the second attitude.

17. The computer program product of claim 16 further comprising:
    computer usable program code for rendering an image of the first viewport in the first tab as a miniature image.

18. The computer program product of claim 17 further comprising:
    computer usable program code for receiving a keystroke corresponding to the first tab; and
    computer usable program code for establishing the first viewport as active, wherein the second viewport is substantially obscured.

19. The computer program product of claim 15, wherein registering the avatar further comprises:
    computer usable program code for removing an association of the avatar with the first coordinate.

20. The computer program product of claim 15 further comprising:
    computer usable program code for rendering a miniature image of the first viewport in the first tab contemporaneously with rendering the second tab.

* * * * *